United States Patent [19]

Burk

[11] 4,362,850
[45] Dec. 7, 1982

[54] PROCESS FOR THE CONTINUOUS POLYMERIZATION OF POLYBLENDS

[75] Inventor: Raymond D. Burk, North Wilbraham, Mass.

[73] Assignee: Monsanto Company, St. Louis, Mo.

[21] Appl. No.: 284,040

[22] Filed: Jul. 17, 1981

Related U.S. Application Data

[63] Continuation of Ser. No. 18,388, Mar. 7, 1979, abandoned.

[51] Int. Cl.$^3$ ............................................. C08F 279/02
[52] U.S. Cl. ........................................ 525/316; 525/86
[58] Field of Search ................................ 525/86, 316

[56] References Cited

U.S. PATENT DOCUMENTS 3,903,202 9/1975 Carter ................................... 525/316
3,945,976 3/1976 McCurdy ............................. 525/316
3,996,311 12/1976 Westphal ............................. 525/316

Primary Examiner—Paul R. Michl
Attorney, Agent, or Firm—Joseph S. Nelson; William J. Farrington; Paul D. Matukaitis

[57] ABSTRACT

The present invention relates to an improved process for the continuous mass polymerization of solutions comprising a alkenyl aromatic monomer having a diene rubber polymer dissolved therein comprising the steps of polymerizing said solution in a first reaction zone to about 15 to 50% conversion dispersing said diene rubber or rubber particles in a partially polymerized solution, followed by further polymerization said partially polymerized solution in a second polymerization zone to about 20 to 95% conversion the improvement comprising having present in said solution, as fed to said first reaction zone, a polymer of said monomers in an amount sufficient to control the size of said diene rubber particles.

2 Claims, No Drawings

PROCESS FOR THE CONTINUOUS POLYMERIZATION OF POLYBLENDS

This is a continuation of application Ser. No. 18,388, filed Mar. 7, 1979, abandoned.

BACKGROUND OF THE INVENTION

It is known to polymerize solutions comprising alkenyl aromatic monomers having a diene rubber dissolved therein to form polyblends having a matrix phase of polymers of said monomers having dispersed therein particles of said diene rubber grafted with said monomers.

Mass and mass/suspension processes have been used to prepare such polyblends. U.S. Pat. No. 3,903,202 is one such suitable process for the continuous mass polymerization of such polyblends and it is hereby incorporated by reference.

The morphology of the rubber particles dispersed in the polyblend is critical to the final properties of the polyblend. Generally, the larger the size of said rubber particles, the greater the toughness and the smaller the size, the higher the gloss. Hence, the size of the rubber particles must be controlled to insure the control of the properties of the polyblend. U.S. Pat. No. 3,903,202 discloses that agitation during the early phases of polymerization disperses the dissolved rubber as particles and that higher rates of agitation generally decreases the size of said particles with lower rates of agitation producing larger particles. Controlling agitation rates then provides a means for sizing said rubber particles. It has been found that lower rates of agitation, however, creates problems of heat transfer and inhomogeneity that are difficult to control when operating at the lower agitation rates needed to produce larger particles. This is particularly true in continuous processes wherein large amounts of monomers are being polymerized and heat and homogeneity control are imperative to process and product control.

The art has disclosed other methods for sizing the rubber particles other than by agitation rates. U.S. Pat. No. 3,660,535 discloses a method wherein a partially polymerized solution of rubber and monomers is recycled into a stratifying type polymerizing system having linear flow. The effluent from the first reactor, having a conversion of about 20 to 38%, is recycled as a partially polymerized solution in varying amounts to the feed stream at a location of essentially zero conversion and prior to phase inversion in the first reactor.

This procedure has been found to vary the particle size of the rubber during the inversion of the rubber phase, however, control has been found to be difficult because the recycle stream contains grafted rubber particles that have varying levels of graft varying with levels of conversion in the recycle stream. The grafted rubber particles in the rubber phase has been found to act as a soap or dispersing agent for the rubber particle in the monomer-polymer phase during inversion of the two phases, hence, minor variations in graft or conversion have a profound effect on particle size control.

This is particularly evident as polymerization is carried out in a linear flow stratifying reactor system wherein inversion gradually occurs as the feed stream is progressively polymerized from 0% to 20 to 38% conversion down through the stratified reactor.

U.S. Pat. No. 3,398,214 disclosed a batch mass polymerization process wherein a partially polymerized monomer batch of 30-40 conversion is blended with a partially polymerized rubber-monomer batch of less than 10% conversion and the blend is then completely polymerized by batch polymerization. The process is operable only when the monomer-rubber solution is prepolymerized to not greater than 10% conversion which provides very small rubber particles for high gloss in molded parts. High toughness is only developed when the monomer-rubber solution is polymerized to about 3% or less. Such processes do not provide high efficiency at such low conversions.

U.S. Pat. No. 3,488,743 discloses a process wherein a solution of monomer, low molecular weight rubbers and polymer are batch mass polymerized then finished by batch suspension polymerization.

Such batch process produce polymers having relatively small rubber particles which do not efficiently toughen the polyblends having relatively low elongation at fail. Beyond properties, the batch processes require long conversion cycles to graft, invert and disperse the rubber phase, hence, having high energy requirements.

It is the objective of the present invention to provide an improved continuous mass polymerization process for monomer-rubber solutions that inverts and disperses the dissolved rubber into rubber particles rapidly such that the rubber particle is controlled as to particle size and particle size distribution providing improved physical property control.

It is also the objective of the present invention to provide an improved continuous mass polymerization of monomer-rubber solutions wherein the improvement comprises adding minor amounts of a polymer of said monomers to the monomer-rubber solution such that the dissolved rubber becomes inverted and dispersed rapidly into rubber particles such that the rubber particles are controlled as to particle size and particle size distribution providing improved physical property control.

The sequence of steps is critical in providing the improved process. The first reaction zone is operating under steady state conversion of about 15 to 50% conversion, such that as said monomer-rubber solution enters said first reaction zone the dissolved rubber inverts into dispersed rubber particles. The first reaction zone is operating under back mixed steady state polymerization such that the partically polymerized solution is homogeneous as to temperature, viscosity and chemical composition causing said dissolved rubber to invert and be sized into rubber particles in a continuous and controlled operation.

The improved process of the present invention provides that the monomer-rubber solution has present a sufficient amount of a polymer of said monomers such that said dissolved rubber phase inverts and is dispersed rapidly into rubber particles, said rubber particles having higher levels of said polymer of said monomer as occluded polymer during inversion that controls the size and size distribution of said particles. During the rapid inversion of the dissolved rubber, there is less grafted rubber particles in the rubber phase as a soap to decrease the particle size, hence, larger particles can be formed at the higher agitation rates needed for heat transfer. Here, the larger the concentration of the polymer added to the monom-er rubber solution, the larger the particle providing a means for readily controlling the rubber particle size. As the rubber particles move through the first and second reaction zones the rubber particles develop a grafted rubber phase which stabilizes the rubber particles at the size formed during inversion so that particles size is controlled in the final product.

SUMMARY OF THE INVENTION

The present invention relates to an improved process for the continuous mass polymerization of a solution comprising an alkenyl aromatic monomer having a diene rubber dissolved therein comprising the steps:

A. continuously charging said solution of an alkenyl aromatic monomer having a diene rubber dissolved therein to a first flow through reaction zone, B. continuously polymerizing said solution under back mixed agitation and steady state conditions, said monomer being polymerized to an average conversion of about 15 to 50% said diene rubber being dispersed as diene rubber particles having present grafted and occluded polymers of said monomer in amounts of about 1 to 5 parts per 100 part of said diene rubber, said solution becoming a partially polymerized solution, C. continuously withdrawing said partially polymerized solution from said first reaction zone, D. continuously charging said partially polymerized solution to a second flow through reaction zone and further polymerizing said partially polymerized solution to about 20 to 95% conversion under substantially linear flow, E. continuously removing an effluent from said second reaction zone and continuously separating a polyblend from said effluent, said polyblend having a matrix phase comprising said polymerized monomer having dispersed therein said diene rubber particles, F. the improvement comprising: said solution being continuously charged in step (A) having present a polymer comprising said monomer in amount sufficient to control the size of said rubber particles being dispersed in step (B).

PREFERRED EMBODIMENTS

Exemplary of the monomers that can be employed in the present process are styrene: alpha-alkyl monovinylidene monoaromatic compounds, e.g. alpha-methylstyrene, alpha-ethylstyrene, alpha-methylvinyltoluene, etc.; ring-substituted alkyl styrenes, e.g. vinyl toluene, o-ethylstyrene, p-ethylstyrene, 2,4-dimethylstyrene, etc.; ring-substituted halostyrenes, e.g. o-chlorostyrene, p-chlorostyrene, o-bromostyrene, 2,4-dichlorostyrene, etc.; ring-alkyl, ring-halo-substituted styrenes, e.g. 2-chloro-4-methylstyrene, 2,6-dichloro-4-methylstyrene, etc. If so desired, mixtures of such monovinylidene aromatic monomers may be employed.

The alkenyl aromatic monomer can be used in combination with comonomers such as alkenyl nitrile; e.g., acrylonitrile methacrylonitrile, etc., or acrylates such as acrylic acid, methacrylic acid, methyl methacrylate, etc.

The styrene-acrylonitrile monomers having, 1 to 15% by weight a diene rubber dissolved therein, can be continuously mass polymerized to polyblends known as ABS. Such polyblends can contain styrene and acrylonitrile type monomers in weight ratios of about 90:10 to 50:50 respectively, preferably 80:20 to 70:30 by weight.

In addition to the monomers to be polymerized, the formulation can contain catalyst where required and other desirable components such as stabilizers, molecular weight regulators, etc.

The polymerization may be initiated by thermal monomeric free radicals, however, any free radical generating catalyst may be used in the practice of this invention including actinic irradiation. Conventional monomer-soluble peroxy and perazo catalysts may be used. Exemplary catalysts are di-tert-butyl peroxide, benzoyl peroxide, lauroyl peroxide, oleyl peroxide, toluyl peroxide, di-tert-butyl diperphthalate, tert-butyl peracetate, tert-butyl perbenzoate, dicumyl peroxide, tert-butyl peroxide isopropyl carbonate, 2,5-dimethyl-2,5-dimethyl-2,5-di-(tert-butylperoxy) hexane, 2,5-dimethyl-2,5-di(tert-butylperoxy) hexane-3 or hexyne-3, tert-butyl hydroperoxide, cumene hydroperoxide, p-menthane hydroperoxide, cyclopentane hydroperoxide, pinane hydroperoxide, 2,5-dimethylhexane-2,5-dihydroperoxide, etc., and mixtures thereof.

The catalyst is generally included within the range of 0.001 to 3.0% by weight and preferably on the order of 0.005 to 1.0% by weight of the polymerizable material, depending primarily upon the monomer present.

As is well known, it is often desirable to incorporate molecular weight regulators such as mercaptans, halides and terepenes in relatively small percentages by weight, on the order of 0.001 to 1.0% by weight of the polymerizable material. From 2 to 20% diluents such as ethylbenzene, ethyltoluene, ethylxylene, diethylbenzene or benzene may be added to the monomer composition to control viscosities at high conversions and also provide some molecular weight regulation. In addition, it may be desirable to include relatively small amounts of antioxidants or stabilizers such as the conventional alkylated phenols. Alternatively, these may be added during or after polymerization. The formulation may also contain other additives such as plasticizers, lubricants, colorants and non-reactive preformed polymeric materials which are suitable or dispersible therein.

THE RUBBER SUBSTRATE

Exemplary of the various rubbers onto which the polymerizable monomer formulation can be grafted during polymerization in the presence thereof to provide the graft copolymers are diene rubbers, natural rubbers, ethylenepropylene terpolymer rubbers, acrylate rubbers, polyisoprene rubbers and mixtures thereof, as well as interpolymers thereof with each other or other copolymerizable monomers.

The preferred substrates, however, are diene rubbers (including mixtures of diene rubbers), i.e., any rubbery polymer (a rubbery polymer having a second order transition temperature not higher than 0° centigrade, preferably not higher than $-20°$ centigrade, as determined by ASTM Test D-746-52T) of one or more of the conjugated, 1,3 dienes; e.g. butadiene, isoprene, 2-chloro-1,3 butadiene, 1 chloro-1,3-butadiene, piperylene, etc. Such rubbers include copolymers and block copolymers of conjugated 1,3-dienes with up to an equal amount by weight of one or more copolymerizable monoethylenically unsaturated monomers, such as monovinylidene aromatic hydrocarbons (e.g. styrene; an aralkylstyrene, such as the o-, m- and p-methylstyrenes, 2,4-dimethylstyrene, the arethylstyrenes, p-tert-butylstyrene, etc.; an alphamethylstyrene, alphaethylstyrene, alpha-methyl-p-methyl styrene, etc.; vinyl naphthalene, etc.); arhalo monovinylidene aromatic hydrocarbons (e.g. the o-, m- and p-chlorostyrene, 2,4-dibromostyrene, 2-methyl-4-chlorostyrene, etc.); acrylonitrile; methacrylonitrile; alkyl acrylates (e.g. methyl acrylate, butyl acrylate, 2-ethylhexyl acrylate, etc.), the corresponding alkyl methacrylates; arcylamides (e.g. acrylamide, methacrylamide, N-butylacrylamide, etc.); unsaturated ketones (e.g. vinyl methyl ketone, methyl isopropenyl ketone, etc.); alpha-olefins (e.g. ethylene, propylene, etc.); pyridines; vinyl esters (e.g. vinyl acetate, vinyl stearate, etc.); vinyl and vinylidene halides (e.g. the vinyl and vinylidene chlorides and bromides, etc.); and the like.

Although the rubber may contain up to about 2.0% of a crosslinking agent, based on the weight of the rubber-forming monomer or monomers, crosslinking may present problems in dissolving the rubber in the monomers for the graft polymerization reaction. In addition, excessive crosslinking can result in loss of the rubber characteristics.

A preferred group of rubbers are the stereospecific polybutadiene rubbers formed by the polymerization of 1,3-butadiene. These rubbers have a cis-isomer content of about 30–98% and a trans-isomer content of about 70–2% and generally contain at least about 85% of polybutadiene formed by 1,4 addition with no more than about 15% by 1,2 addition. Mooney viscosities of the rubber (ML-4, 212° F.) can range from about 20 to 70 with a second order transition temperature of from about −50° to −105° C. as determined by ASTM Test D-746-52T.

GRAFTED RUBBER PHASE

A monomer composition comprising at least one monoalkenyl aromatic monomer having about 2–15% by weight of a diene rubber dissolved therein is charged continuously as a monomer-rubber solution to the initial reaction zone. The monomer is polymerized at temperatures of about 110°–145° C. in the first zone converting about 15–50% by weight of the monomer to a alkenyl aromatic polymer, already described, as a first polymer. At least a portion of the first polymer polymerized is grafted as polymer molecules to the diene rubber as a superstrate.

Although the amount of polymeric superstrate grafted onto the rubber substrate may vary from as little as 10.0 parts by weight to 100.0 parts of substrate to as much as 250.0 per 100.0 parts and even higher, the preferred graft copolymers will generally have a superstrate to substrate ratio of about 20 to 200:100 and most desirably about 30 to 150:100. With graft ratios about 30 to 150:100; a highly desirable degree of improvement in various properties generally is obtained.

The remainder of the first polymer formed is dissolved in said monomer composition as polymerized forming a monomer-polymer solution. The monomer-polymer solution or phase is incompatible with the monomer-rubber solution or phase and phase separation is observed by the well known Dobry effect. As the polymer concentration of the monomer polymer-phase increases and has a volume slightly larger than the monomer-rubber phase, the monomer-rubber phase disperses as rubber-monmer particles aided by the shearing agitation of the stirred first reaction zone.

The agitation must be significant and of high enough shear to disperse and size the rubber particles uniformly throughout the monomer-polymer phase. The intensity of the stirring will vary with the size and geometry of the initial reactor, however, simple experimentation with a given stirred reactor will establish the sufficient amount of stirring needed to insure the homogeneous dispersion of the rubber particles throughout the monomer-polymer phase. The particle size of the rubber can be varied from a weight average particle diameter of from about 0.5 to 10 microns preferably from 0.5 to 5 microns to provide a balance between the impact strength and the gloss of the rubber reinforced polyblend. Higher stirring rates and shearing agitation can lower the size of the dispersed rubber particle, hence, must be controlled to provide sufficient stirring to size the particles to the predetermined size needed and insure homogeneous dispersion.

At steady state polymerization, in the initial polymerization zone, the continuously charged monomer composition containing 2 to 15% by weight diene rubber dispersed rapidly under stirring, forming the rubber-monomer particles which on complete polymerization form discrete rubber particles. The conversion of monomers to polymers in the first reaction zone is controlled between 15–50% and must have a weight percent level that provides a polymer content in excess of the rubber content of the monomer composition to insure the dispersion of the monomer-rubber phase to a rubber-monomer particle phase having a predetermined size and being dispersed uniformly throughout the monomer-polymer phase.

The rubber particle becomes grafted with a first polymer in the first reaction zone which aids its dispersion and stabilizes the morphology of the particle. During the dispersion of the rubber-monomer particles, some monomer-polymer phase is occluded within the particle. The total amount of occluded monomer-polymer phase and grafted polymer present in the particles can be from about 1 to 5 grams for each gram said diene rubber.

The dispersed rubber phase increases the toughness of the polymeric polyblend as measured by its Izod impact strength by Test ASTM D-256-56. It has been found that the impact strength of polyblends increase with the weight percent rubber dispersed in the polyblend in the range of 2 to 15% as used in the present invention. The impact strength is also determined by the size of the dispersed rubber particles, with the large particles providing higher impact strength in the range of 0.5 to 10 microns measured as a weight average particle size diameter with a photosedimentometer by the published procedure of Graves, M. J. et.al., "Size Analysis of Subsieve Powders Using a Centrifugal Photosedimentometer," British Chemical Engineering 9:742–744 (1964). A Model 3000 Particle Size Analyzer from Martin Sweets Co., 3131 West Market Street, Louisville, Ky. was used.

The weight average diameter of the rubber particles also effects gloss with smaller particles giving high gloss and the larger particles giving low gloss to the fabricated polyblend article such as a molding or sheet product. One must balance impact strength and gloss requirements in selecting an optimum rubber particle size. The range of 0.5 to 10 microns can be used with the range of 0.5 to 5 microns being preferred and 0.8 to 3 microns being most preferred for optimum impact strength and gloss.

Processwise, in the initial reactor, one must (1) form and disperse the rubber particle and (2) graft and stabilize the rubber particle maintaining its size and morphology or structure. The amount of occluded monomer-polymer phase described above is held at a predetermined level described above by steady state polymerization wherein the monomer is converted to polymer, at least a portion of which, grafts to the rubber stabilizing the rubber particle. It has been found that the higher the amount of occlusion stabilized within the rubber particle the more efficiently the rubber phase is used in toughening the polyblend. The rubber particle acts much as a pure rubber particle if the occlusions are controlled at the amount described above during their stabilization in the initial reaction zone and throughout the total polymerization process. The rubber particle is also grafted externally stabilizing its structure as to size and its dispersibility in the monomer-polymer phase.

The initial reactor forms a first mixture or partially polymerized solution of a monomer-polymer phase having the rubber phase described dispersed therein. The first mixture can be charged to a staged isobaric reaction zone as a second zone and described herein. The first mixture is polymerized by progressive multistage substantial linear flow polymerizations with the conversion of polymer advancing from about 15–50% conversion in the first stage to 50 to 90% conversion in the final stage of the staged isobaric stirred reaction zone as a second zone. This provides a gradual progressive increase of polymer in the monomer-polymer phase. This has been found to be important in maintaining the morphology or structure of the dispersed rubber-monomer particles.

It has been found unexpectedly that in the initial reaction zone as the rubber particle is formed, that the rubber-monomer particle has a monomer content that corresponds to the monomer content of the monomer-polymer phase. The rubber-monomer particle will stabilize at this level as the monomer polymerizes inside the rubber particle and grafted polymer is formed on the outside. Hence, it has been found that the lower the level of conversion or polymer in the monomer-polymer phase of the initial reactor the higher the amount of monomer found in the rubber-monomer particles formed as the rubber solution is charged and dispersed in the monomer-polymer phase. Conversely, if the conversion is high in the initial stage less monomer is occluded in the rubber phase particle on dispersion. As described earlier, the first mixture is polymerized in the staged linear flow second zone and the percent by weight of polymer being formed is progressively higher with each stage having a slightly higher polymer content. The staged linear progressive polymerization was found not only to control the polymerization of the monomer giving desirable polymers but was found unexpectedly to preserve the integrity of the rubber particles. Although not completely understood, as the rubber particle becomes grafted and the monomer-polymer phase forms in the occluded monomer of the rubber particle, the monomer is not readily extracted from the rubber particle by the monomer-polymer phase as the polymer content increases gradually in the monomer-polymer phase during polymerizing in the staged reactor. It is thought that since the polymerization in the multistaged linear reaction zone is so gradual that polymer is being formed in both the rubber particle and the monomer-polymer phase at about the same rate, hence, the total polymer content of the occluded monomer-polymer phase of the rubber particle is about the same as polymer content of the monomer-polymer phase and monomer is not extracted, hence, the weight percent of occlusion is stabilized and remains substantially constant after formation in the initial reactor.

It has been found possible to analyze the amount of total occluded polymer phase and grafted polymers. The final polymerized polyblend product (1 gram) are dispersed in a 50/50 acetone/methyl ethyl ketone solvent (10 ml.) which dissolves the polymer phase matrix leaving the rubber phase dispersed. The rubber phase is separated from the dispersion by centrifuge as a gel and dried in a vacuum oven at 50° C. for 12 hours and weighed as a dry gel.

$$\% \text{ Dry gel in Polyblend} = \frac{\text{Weight of dry gel}}{\text{Weight of polyblend}} \times 100$$

$$\left.\begin{array}{l}\% \text{ Graft and}\\ \text{Occlusions}\\ \text{in Rubber}\end{array}\right\} = \frac{\% \text{ dry gel} - \% \text{ rubber}}{\text{Percent rubber*}} \times 100$$

$$\left.\begin{array}{l}\text{Parts** by weight}\\ \text{of graft polymer}\\ \text{and occluded polymer per unit weight}\\ \text{of rubber}\end{array}\right\} = \frac{\% \text{ dry gel} - \% \text{ rubber}}{\text{Percent rubber}}$$

*Percent rubber determined by infra-red spectrochemical analysis of the dry gel
**The present invention preferably has present about 0.5 to 5 grams of occluded and grafted polymer per gram of diene rubber particle.

The swelling index of the rubber graft particles is determined by taking the dry gel above and dispersing it in toluene for 12 hours. The gel is separated by centrifuge and the supernatant toluene drained free. The wet gel is weighed and then dried in a vacuum oven for 12 hours at 50° C. and weighed.

$$\text{Swelling Index} = \frac{\text{weight of wet gel}}{\text{weight of dry gel}}$$

As described earlier the amount of occlusions and graft polymer present in the rubber particle is present in the amount of about 0.5 to 5 part for each part of diene rubber. The percent dry gel measured above then is the percent gel in the polymerized polyblend and represents the dispersed rubber phase having polymeric occlusions and polymeric graft. The percent gel varies with the percent rubber charged in the monomer composition and the total amount of graft and occluded polymer present in the rubber phase.

The swelling index of the rubber as determined above is important to the final properties of the polyblend. A low swelling index indicates that the rubber has been crosslinked by the monomer as it polymerizes to a polymer phase in the rubber-monomer particle during steps (B) and (D). Generally, the conversion of monomer to polymer in the occlusion follows the rate of conversion of monomer to polymer in the monomer-polymer phase being carried out in steps (B) and (D). In step (E) the temperatures of the second mixture is raised to about 200° to 250° C. and the monomer vapors are separated in step (E) to give a finished polyblend. The rubber particles become crosslinked by heating the second mixture to from about 200° to 250° C. for sufficient time to crosslink the rubber particles such that they have a swelling index of from about 7 to 20 preferably from about 8 to 16.

Preferably, the combined polymer of the matrix phase of the polyblends produced by this invention have a dispersion index (Mw/Mn), wherein Mw is a weight average molecular weight and Mn is a number average molecular weight, ranging from about 2.0 to 4.0 preferably 2.2 to 3.5. The dispersion index is well known to those skilled in the art and represents the molecular weight distribution with the lower values having narrow molecular weight distribution and higher values having broader molecular weight distribution. The weight average molecular weight of the combined polymer of the matrix phase preferable range from 150,000 to 300,000.

SECOND REACTION ZONE POLYMERIZATION

The second reaction zone polymerization can be carried out in a staged isobaric stirred reaction zone maintaining conditions so as to polymerize said first mixture by progressive multistage substantially linear flow polymerization all said stages operating with shearing agitation and common evaporation vapor phase cooling under isobaric conditions in said second reaction zone, providing each said stage with steady state polymerization at controlled temperature and interfacial liquid contact stage to stage establishing a hydraulic pressure gradient from the first stage downstream to the final stage causing substantially linear flow through said second zone, all said stages operating at predetermined conversion levels producing a composite polymer as a second polymer in said second reaction zone having a predetermined molecular weight distribution and average molecular weight maintaining the structural integrity of said dispersed rubber particle, said second zone producing a second mixture having a total polymer content being determined by said multistage steady state polymerization and evaporation of said monomers.

The reactor operates under controlled isobaric conditions. For the range of temperatures normally of interest for alkenyl aromatic monomers, e.g. styrene polymerization (130°-180° C.), the operating pressure will range from 7 to 28 psia. The styrene reaction is exothermic and cooling is provided primarily by vaporization of a part of the monomer from the reacting mass. Further cooling can be provided by a jacket. Cooling by the condensed recycle monomer feeding into either the first or second reaction zone is also provided. The mass is in a boiling condition and temperature is determined by the natural relationship between vapor pressure and boiling point. This relationship is also a function of the relative amounts of polymer, monomer, and other substances (e.g. dissolved rubber, solvents and additives.) Since, as material progresses through this reactor the amount of polymer continuously increases and the amount of monomer corresponding decreases via polymerization and monomer content further decreases due to vaporization loss, the temperature progressively increases from inlet to outlet stages.

To accommodate the natural swell of the boiling mass and to provide space for vapor disengagement, the reactor is usually run at a fillage of about 10 to 90% preferably 40 to 60% of its volume.

Vapor passes out of the reactor to an external condenser where it is condensed and may also be subcooled. This condensate may then be handled in several ways, for example:

1. If the reactor use this invention is preceded by another reactor in a multireactor train, the condensate may be returned to a preceding reactor.

2. The condensate may be returned to the inlet compartment of the reactor used this invention, wherein it is reheated by condensation of a fraction of the previously evolved vapors and mixed other incoming free materials.

In a multi-compartment staged reactor, each stage is well mixed and the reaction mass is substantially homogeneous within itself. The discs which separate the stages discourage backflow of material between compartments. The clearance between disc and shell does permit some backflow and also permits the necessary forwarding of material through the compartments from reactor inlet to outlet giving substantially linear flow.

In a compartmented staged reacrtor as here described, the first stage has a relatively low conversion level, since it is being continuously fed by monomer and low conversion prepolymerized syrup. However, the rate of conversion in this stage is relatively high because of the high concentration of monomer.

In each succeeding stage, the conversion level is higher than in the preceding one, which tends to lower the rate of conversion. Offsetting this effect, however, are the facts that the temperature is higher and that monomer is being vaporized out of the mass. Thus, the total conversion to polymer obtained per unit fillage volume of the staged reactor is higher than that which could be obtained in a single stage reactor producing an equal final conversion level at equal temperature.

Clearance between rotatig disc compartment baffles and cylindrical wall may be from 1 to 10% of shell radius, the larger values being appropriate to the high conversion end of the reactor where viscosity is at maximum. Stage to stage forward flow of the polymerizing first mixture is through this clearance and vapor from the polymerizing first mixture also counterflow through the clearance, above the surface level of the mass.

If the alkenyl monomer is used in combination with an alkenyl nitrile monomer, operations are essentially the same except for controlling the styrene-acrylonitrile composition of the monomers during polymerization. The styrene type monomer adds to the copolymer at a faster rate than the acrylonitrile monomer, hence, the acrylonitrile monomer is generally charged at higher weight percentages in the charged monomer formulation to insure a desired weight percent in the polymerized copolymer. The two monomers form an azeotrope at about 75% styrene and 25% acrylonitrile so that no shift in monomer or polymer composition occurs during polymerization, hence, generally the azeotropic monomer mixture is used in the continuous mass polymerizing of ABS polyblends from monomer-rubber solutions.

The polyalkenyl aromatic monomer polymer or copolymer to be dissolved in the monomer-rubber solutions to be fed in step (A) is preferably a polystyrene type polymer or styrene-acrylonitrile type copolymer having a weight average molecular weight of about 20,000 to 300,000 preferably about 150,000 to 250,000. The matrix polymer or copolymer can have a weight average molecular weight of about 150,000 to 300,000.

The amount of polymer or copolymer to be added is dependent on the particle size desired in the polyblend. Generally, the more polymer present, the larger is the rubber particle size as dispersed. The amount to be used is also based on the amount of rubber dissolved in the monomer to be fed in step (A). The amount of polymer or copolymer present in the monomer-rubber solution is about 10 to 150% by weight based on the diene rubber dissolved in said monomer, e.g. if the rubber is present in an amount of about 10 parts in the solution then the polymer or copolymer can be present in an amount of about 1 to 15 parts.

The following examples are set forth to more clearly illustrate the principles and practice of the present invention. They are intended to be illustrative and not limiting as to the scope of the invention.

EXAMPLE 1—CONTROL

A monomer composition consisting of 5 parts by weight of stereospecific polybutadiene rubber in 95 parts by weight of styrene monomer is prepared by agitating the mixture at 40° C. for 8 hours. The rubber used contains approximately 35% cis-1,4 structure; approximately 55% trans-1,4 structure and approximately 10% vinyl-1,2 structure having a Mooney viscosity of the rubber (ML-4, 212° F.) at 55. To the above monomer composition is added 0.5 parts of white mineral oil, 0.1 part by weight of octadecyl 3-(3',5'-di-tertbutyl-4-hydroxyphenyl) propionate and 40 parts by weight of recycled styrene monomer. This monomer composition is fed continuously at approximately 145 lbs./hr. to a 100-gal. anchor-agitated initial reactor operated at approximately 50% fillage and 124° C. under 5 psig. nitrogen pressure. The agitator is approximately 31 inches wide and turns at 65 rpm. A first mixture containing approximately 18% polystyrene is pumped from the above reactor at a continuous rate such as to maintain essentially constant fillage therein and flows to the inlet of the second reactor, a staged isobaric stirred reactor. The second reactor has approximately a 50 gal. capacity and operates at about 40% fillage.

The reactor is about 53 inches long. The agitator consists of a horizontal shaft on which are fixed a series of paddles about 2 inches wide alternating at right angles to one another in a manner similar to that shown in U.S. Pat. No. 3,903,202. Along the shaft and rotating with it are four circular discs with an average radial wall clearance of about three-eighth inch rotating at 15 rpm. These discs are positioned to divide the reactor into five stages of approximately equal volume. The pressure in this reactor is maintained at approximately 20 psia.

The second mixture in the final stage is maintained at about 166° C. and contains about 62% polystyrene. Styrene vapor evaporated from the second reactor is condensed and the condensate is returned to the first compartment. The second mixture is pumped continuously from the final stage at a rate to maintain essentially constant fillage in the second reactor and is delivered to the inlet of the devolatilizer preheater. The second mixture exits from the preheater at approximately 240° C. and enters a devolatilizer chamber maintained at 50 torr. Second mixture volatile vapors exiting the devolatilizer chamber are condensed and recycled to the first reactor preheater feed system. Approximately 3 lbs./hr. of the condensed devolatilized vapors are withdrawn as purge. the devolatilized melt is fed from the devolatilizer chamber to an extruder which forms it into a plurality of strands which are then cooled and cut into pellets. The combined polymer has a molecular weight of about 210,000 and a dispersion index about 3.1.

| Typical Properties | |
|---|---|
| Izod Impact ⅛" × ½" bar 73° F. (ft.lb./in.) | 1.3 |
| Tensile strength at yield (lb./in.) | 3800 |
| Tensile strength at fail (lb./in.) | 3750 |
| Tensile elongation at fail (%) | 62 |
| Swelling index | 9 |
| Parts graft and occlusions/rubber | 1.43:1 |
| Rubber particle size (microns) | 1.5 |

EXAMPLE 2

Example 1 was repeated using 5 parts of rubber and 6 parts of polystyrene having a molecular weight of about 210,000 dissolved in 89 parts of styrene monomer. The monomer-rubber-polystyrene composition was fed continuously as in Example 1. The dispersed rubber phase of the polymerized polyblend had an average rubber particle size of about 5 microns and an impact strength of about 1.75 ft./lbs.

EXAMPLES 3–12

Example 1 was repeated using varying amounts of dissolved rubber and olystyrene in the monomer-rubber solution.

| Example | Rubber Parts | Polystryene Parts | Rubber Particle Size (μ) | Impact Strength ft./lbs.in. |
|---|---|---|---|---|
| 3 | 5 | 3 | 2.4 | 1.51 |
| 4 | 5 | 1 | 1.6 | 1.40 |
| 5 | 7.5 | 10 | 7.3 | 2.20 |
| 6 | 7.5 | 5 | 6.2 | 1.91 |
| 7 | 7.5 | 3 | 3.6 | 1.85 |
| 8 | 7.5 | 0 | 1.0 | 1.20 |
| 9 | 10 | 12 | 9.3 | 2.56 |
| 10 | 10 | 6 | 7.6 | 2.30 |
| 11 | 10 | 3 | 4.2 | 1.87 |
| 12 | 10 | 0 | 1.6 | 1.60 |

EXAMPLE 13—CONTROL

Example 1 was repeated using 5 parts of the diene rubber dissolved in 95 parts of styrene and acrylonitrile monomers wherein the weight ratio of styrene to acrylonitrile was 75 to 25. The ABS polyblend produced had a rubber particle size of about 0.9 microns and an impact strength of about 3.5 ft.lbs./in.

EXAMPLE 14

Example 13 was repeated using a feed stream of 90 parts of styrene-acrylonitrile monomers having a styrene to acrylonitrile weight ratio of 75 to 25 having dissolved therein about 5 parts of a polybutadiene rubber and 5 pats of a styrene-acrylonitrile copolymer having a composition of the monomer feed stream and a weight average molecular weight of about 200,000. The ABS polyblend recovered had a particle size of about 4.3 microns and an impact strength of about 6.4 ft.lbs./in.

It is evident from Examples 1–12 that the size of the rubber particle can be readily changed and controlled by the amount of dissolved polymer present in the monomer-rubber solution keeping the rate of agitation essentially constant. As disclosed supra, the present invention of controlling rubber particle size is preferred and superior to regulating particle size by agitation rates in that agitation rate variations upset reactor conditions such as heat control and polymerization kenetics.

EXAMPLE 15

Example 1 was repeated using an agitation rate of about 90 rpm in the first reaction zone and an average particle size of about 0.5 microns was formed.

EXAMPLE 16

Example 15 was repeated using about 5 parts of polystyrene dissolved in the monomer-rubber solution fed to the first reaction zone and an average particle size of about 1.75 was formed.

It is evident that the present process can be operated such that a wide range of particle sizes can be produced consistent with the balance of impact strength and gloss desired.

The present process as demonstrated in the examples removes a reaction mixture from second reaction zone defined as the second mixture or effluent from the second reaction zone. Said effluent contains the matrix phase polymer having dispersed therein the grafted rubber particles as a polyblend containing residual unpolymerized monomers. The effluent is heated and passed through a devolatilizer and the monomers separated from the polyblend as volatile vapors for recycle to the process. The polyblend is removed from the devolatilizer as a melt and passed through a pelletizing die providing a polyblend in pellet form having utility as a plastic for molding or extrusion fabrication.

The present process has been adapted to a second reaction zone described as a flow through reaction zone wherein the partially polymerized solution is polymerized further to about 20 to 95% conversion under substantially linear flow. The second reaction zone herein-described is adaptable to such polymerization. Other types of second reaction zones can be adapted to the present process such as continuous flow through towers (one or more) having substantially plug or linear flow through a plurality of stages or temperature zones that gradually increase the temperature to finish the polymerization. Various tube reactors have been used in the art as continuous flow through reactors having substantially linear or plug flow which can be adapted to the present process. Hence, the particular reactor used as a second reaction zone can be of the several types known to the art providing the second reaction zone provides continuous flow through and substantially linear flow capability to further polymerize the partially polymerized solution from the first reaction zone.

What is claimed is:

1. An improved process for the continuous mass polymerization of a solution comprising an alkenyl aromatic monomer having a diene rubber dissolved therein comprising the steps:
   A. continuously charging said solution of an alkenyl aromatic monomer having a diene rubber dissolved therein to a first flow through reaction zone,
   B. continuously polymerizing said solution under back mixed agitation and steady state conditions, said monomer being polymerized to an average conversion of about 15 to 50%, said diene rubber being dispersed as diene rubber particles having present grafted and occluded polymers of said monomer in amounts of about 1 to 5 parts per 100 part of said diene rubber, said solution becoming a partially polymerized solution,
   C. continuously withdrawing said partially polymerized solution from said first reaction zone,
   D. continuously charging said partially polymerized solution to a second flow through reaction zone and further polymerizing said partially polymerized solution to about 20 to 95% conversion under substantially linear flow,
   E. continuously removing an effluent from said second reaction zone and continuously separating a polyblend from said effluent, said polyblend having a matrix phase comprising said polymerized monomer having dispersed therein said diene rubber particles,
   F. the improvement comprising: said solution having present a styrene-acrylonitrile polymer have a weight ratio of styrene to acrylonitrile of about 90:10 to 50:50 in an amount sufficient to control the size of said rubber particles being dispersed in step (B).

2. An improved process for the continuous mass polymerization of a solution comprising an alkenyl aromatic monomer having a diene rubber dissolved therein comprising the steps:
   A. continuously charging said solution of an alkenyl aromatic monomer having a diene rubber dissolved therein to a first flow through reaction zone,
   B. continuously polymerizing said solution under back mixed agitation and steady state conditions, said monomer being polymerized to an average conversion of about 15 to 50%, said diene rubber being dispersed as diene rubber particles having present grafted and occluded polymers of said monomer in amounts of about 1 to 5 parts per 100 part of said diene rubber, said solution becoming a partially polymerized solution,
   C. continuously withdrawing said partially polymerized solution from said firt reaction zone,
   D. continuously charging said partially polymerized solution to a second flow through reaction zone and further polymerizing said partially polymerized solution to about 20 to 95% conversion under substantially linear flow,
   E. continuously removing an effluent from said second reaction zone and continuously separating a polyblend from said effluent, said polyblend having a matrix phase comprising said polymerized monomer having dispersed therein said diene rubber particles,
   F. the improvement comprising: said solution having present a styrene-acrylonitrile polymer have a weight ratio of styrene to acrylonitrile of about 90:10 to 50:50 in an amount sufficient to control the size of said rubber particles being dispersed in step (B), said styrene-acrylonitrile polymer having a weight average molecular weight of about 100,000 to 300,000.

* * * * *